(12) United States Patent  
Enomoto

(10) Patent No.: US 7,277,589 B2  
(45) Date of Patent: Oct. 2, 2007

(54) IMAGE RETOUCHING METHOD, APPARATUS, AND PROGRAM STORAGE MEDIUM, IMAGE CORRECTING METHOD, APPARATUS, AND PROGRAM STORAGE MEDIUM, AND EYE DETECTING AND CORRECTING METHOD APPARATUS, AND PROGRAM STORAGE MEDIUM

(75) Inventor: Jun Enomoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 786 days.

(21) Appl. No.: 10/668,250

(22) Filed: Sep. 24, 2003

(65) Prior Publication Data

US 2004/0070598 A1 Apr. 15, 2004

(30) Foreign Application Priority Data

Sep. 24, 2002 (JP) ............................. 2002-277554  
Sep. 24, 2002 (JP) ............................. 2002-277557  
Sep. 24, 2002 (JP) ............................. 2002-277560

(51) Int. Cl.  
*G06K 9/40* (2006.01)  
*H04N 1/46* (2006.01)  
*G06K 9/00* (2006.01)

(52) U.S. Cl. ...................................... 382/254; 358/531

(58) Field of Classification Search ................ 382/254, 382/274, 275, 115, 117, 165, 167, 173; 358/538, 358/518, 527, 531, 530

See application file for complete search history.

(56) References Cited

U.S. PATENT DOCUMENTS

| | | | | |
|---|---|---|---|---|
| 5,748,764 A | * | 5/1998 | Benati et al. | 382/117 |
| 6,134,339 A | * | 10/2000 | Luo | 382/115 |
| 6,873,743 B2 | * | 3/2005 | Steinberg | 382/275 |
| 6,885,766 B2 | * | 4/2005 | Held et al. | 382/167 |
| 6,980,691 B2 | * | 12/2005 | Nesterov et al. | 382/165 |
| 7,035,461 B2 | * | 4/2006 | Luo et al. | 382/167 |
| 7,035,462 B2 | * | 4/2006 | White et al. | 382/167 |
| 2003/0044070 A1 | * | 3/2003 | Fuersich et al. | 382/190 |
| 2003/0086134 A1 | * | 5/2003 | Enomoto | 358/538 |

FOREIGN PATENT DOCUMENTS

JP 2000-76427 A 3/2000  
JP 2001-61071 A 3/2001

* cited by examiner

*Primary Examiner*—Yon J. Couso  
(74) *Attorney, Agent, or Firm*—Sughrue Mion Pllc.

(57) ABSTRACT

The present invention provides an image retouching method including the steps of: detecting a local defect in an original image and distinguishing the type of the defect on the basis of image data representing the original image; displaying the defect detected at the detecting step with a mark corresponding to the type of the defect and receiving a correction to an inaccuracy in the detection of the defect displayed; and retouching the image data representing the original image according to the type of the defect of which any detection inaccuracy is corrected.

20 Claims, 15 Drawing Sheets

IMAGE RETOUCHING METHOD, APPARATUS, AND PROGRAM STORAGE MEDIUM, IMAGE CORRECTING METHOD, APPARATUS, AND PROGRAM STORAGE MEDIUM, AND EYE DETECTING AND CORRECTING METHOD APPARATUS, AND PROGRAM STORAGE MEDIUM

BACKGROUND OF THE INVENTION

1. Field of the Invention

The present invention relates to an image retouching method, apparatus, and program storage medium storing an image retouching program, an image correcting method, apparatus, and program storage medium storing an image correcting program, an eye detecting and correcting method, apparatus, and program storage medium storing an eye detecting and correcting program, in which local flaws such as scratches, red-eye, and closed eyes in an original image are corrected according to image data that represents the original image.

2. Description of the Related Art

Along with the widespread use of digital still cameras, the area of photography has speeded toward digitalization. The digitalization has an advantage in that photographs can be electronically processed to correct imperfections in color or exposure. Software tools, called photo retouch software, for retouching photographs on a personal computer have also become widely available.

Furthermore, techniques have been proposed that correct local defects in images, such as scratches in an image, a dark, back-lighted main subject, the red or gold-eye effect, which is a red or gold appearance of the pupils of a person in a picture taken with a photographic flash, or eyes closed or a mouth opened during shooting. For example, in Patent Document 1 describes a technique concerning correction of red-eye. Such a defect affects profoundly the appearance of photographs and frequently occurs in pictures taken by amateur photographers. Therefore their correction is demanded especially in the field of photography.

One of the simplest approaches to locating a flaw to be corrected in a picture may be one in which a user uses photo retouch software to visually checks the picture to identify the flaw. However, it is inefficient to consciously check every picture. Low efficiencies pose an acute problem for commercial photo laboratories that print out digital photographs.

To solve the problem, techniques for automatically detecting defects in a picture have been proposed. For example, Patent Document 2 describes a method for detecting red-eye. Such automatic detection can be used to correct a detected defect, thereby automating the process from detection to correction.

[Patent Document 1]

Japanese Patent Laid-Open No. 2000-76427

[Patent Document 2]

Japanese Patent Laid-Open No. 2001-61071

However, such automatic detection cannot always accurately detect a defect. Especially when different corrections are to make to different types of defects, an erroneous detection may result in an erroneous correction, thereby degrading the picture quality.

Moreover, it takes enormous processing time to perform defect detection and correction according to the conventional techniques on a personal computer. For example, template matching may take several seconds per image in image data consisting of 1,500×1,000 pixels. Such long processing time make it impracticable to incorporate such a defect detection and correction function according to such conventional technique into laboratory devices for generating photo prints from photo film at a photo shop, for example.

Moreover, conventional automatic detection and correction cannot adequately correct defects. For example, when one of the eyes of a person is corrected or the eyes of one person among a number of people are corrected, the corrected eye or eyes may give an odd impression.

These defects are not limited to the field of photography. It may occur in any fields in which techniques for detecting and correcting local defects in images are used.

An object of the present invention is to provide an image retouching method, apparatus, and program storage medium storing an image retouching program that can improve the accuracy of defect correction without sacrificing efficiency, an image correcting method, apparatus, and program storage medium storing an image correcting program that can reduce processing time, and an eye detecting and correcting method, apparatus, and program storage medium storing an eye detecting and correcting program that can properly correct a defect in eyes in images.

SUMMARY OF THE INVENTION

The present invention has been made in view of the above circumstances and provides an image retouching method, apparatus, and program storage medium, an image correcting method, apparatus, and program storage medium, and an eye detecting and correcting method, apparatus, and program storage medium.

An image retouching method of the present invention that achieves the object has: a detecting step of detecting a local defect in an original image and distinguishing the type of the defect on the basis of image data representing the original image; a displaying step of displaying the defect detected at the detecting step with a mark corresponding to the type of the defect and receiving a correction to an inaccuracy in the detection of the defect displayed; and a retouching step of retouching the image data representing the original image according to the type of the defect of which any detection inaccuracy is corrected.

The image retouching method of the present invention allows a user to readily see whether or not a defect is detected and the type of a detected defect and therefore provides increased productivity because a detected defect is displayed with a mark corresponding to the type of the defect (for example gold-eye or red-eye). Furthermore, if there is an inaccuracy in the detection, it can be corrected, therefore the accuracy of the correction is improved.

Among local defects in an image, a defect in a facial part considerably affects the appearance of the image. In order to accurately correct a defect in a facial part, the detecting step of the image retouching method of the present invention preferably detects a defect in a facial part in the original image. Among facial part defects, a defect in an eye greatly affects the appearance of the image. Therefore, in order to accurately correct a defect in an eye, the detecting step of the image retouching method of the present invention preferably detects a defect in an eye in the original image.

An image retouching apparatus of the present invention that achieves the above-described object has a detecting section that detects a local defect in an original image and distinguishes the type of the defect on the basis of image data representing the original image; a display section that displays the defect detected at the detecting section with a mark corresponding to the type of the defect and receiving a correction to an inaccuracy in the detection of the defect displayed; and a retouching section that retouches the image data representing the original image according to the type of the defect of which any detection inaccuracy is corrected.

An image retouching program storage medium of the present invention that achieves the above-described object stores an image retouching program having: a detecting section that detects a local defect in an original image and distinguishes the type of the defect on the basis of image data representing the original image; a displaying section that displays the defect detected at the detecting step with a mark corresponding to the type of the defect and receiving a correction to an inaccuracy in the detection of the defect displayed; and a retouching section that retouches the image data representing the original image according to the type of the defect of which any detection inaccuracy is corrected.

While only basic features of the image retouching apparatus and program according to the present invention are described in order to avoid repetition, the other features corresponding to the features of the image retouching method, beside the above-described basic features, are included in the image retouching apparatus and program.

Like names, such as "detecting section" and "displaying section," are used to refer to like components of the image retouching apparatus and the image retouching program herein. However, the components of the image retouching program are software performing the functions that their names imply and the each component of the image correcting apparatus is a combination of software and hardware.

Each component, such as the detecting section, of the image retouching program may be implemented by a single program module or a number of program modules. Or, a number of components may be implemented by a single program module. Furthermore, such a component by itself may perform a function or may direct another program or program module installed in the computer to perform a function.

An image correcting method of the present invention that achieves the above-described object is a method for detecting and correcting a particular defect in an eye in an image on the basis of image data representing the image, has: a preprocessing step of narrowing down at least one of a set of images represented by the image data and a set of regions in one of the images to obtain an image or a region that meets a predetermined condition indicating a possible presence of a defect; and a correcting step of detecting and correcting the defect in the image or region obtained at the preprocessing step on the basis of the image.

According to the image correcting method of the present invention, the preprocessing excludes images or regions that are unlikely to contain a defect from the candidates for correction, thereby leaving only those images and regions that are likely to contain defects. The preprocessing can be performed easily in a short time according to simple indications. Consequently, the efficiency of the entire correcting process is improved and the processing time is reduced. In addition, the preprocessing can reduce erroneous detections of defects by excluding those images or regions that obviously contain no defect from candidates for correction.

In a preferable form of the image correcting method of the present invention, the image data representing a photograph has shooting information obtained during shooting and attached to the image data; and the preprocessing step performs preprocessing according to the shooting information attached to the image data.

The shooting information attached to the image data may be information such as information concerning Exif, the flash on/off, the shutter speed, the f number, the exposure value, the lens-to-subject distance, the shooting mode, the top and bottom of the picture, the time stamp when the picture was taken, and the model of the camera. Such shooting information can be used to readily exclude images that are unlikely contain defects from the candidates for correction, thereby efficiently leaving only those images that may contain defects. For example, if the flash on/of information indicates the off state, or the time stamp indicates daytime and the f number is small, then it is unlikely that the red-eye or gold-eye effect occurs.

It may be preferable that the preprocessing step is performed on the basis of scene analysis of an image represented by image data.

The scene analysis may be the detection of flash photography, the face of a person, a blue sky, or the ground, for example. Whether or not flash has been used can be determined from the degree of underexposure, the average density, the dynamic range, and the maximum and minimum RGB value. The scene analysis can be used to limit the subject region of correction to the region of the face of a person. Limiting the subject region of correction in the preprocessing can substantially reduce the processing time. Therefore, the method can readily be included in laboratory devices.

Also, it may be preferable that the preprocessing step is performed by following operations by an operator.

Certain types of defects are difficult to detect on the basis of shooting information or scene analysis. On the other hand, the operator in some cases can quickly identify images that cannot contain defects. In such a case, preprocessing by operator operations can reduce processing time.

Preferably, the image correcting method of the present invention has the step of displaying the result of the preprocessing step for confirmation.

An error in the displayed result of preprocessing can be corrected or the images or regions displayed as the possible subjects of correction can be further narrowed down.

An image correcting apparatus of the present invention that achieves the above-described object is an apparatus for detecting and correcting a particular defect in an eye in an image on the basis of image data representing the image, includes: a preprocessing section that narrows down at least one of a set of images represented by the image data and a set of regions in one of the images to obtain an image or a region that meets a predetermined condition indicating a possible presence of a defect; and a correcting section that detects and corrects the defect in the image or region obtained at the preprocessing step on the basis of the image.

An image correcting program storage medium of the present invention that achieves the above-described object stores an image correcting program for detecting and correcting a particular defect in an eye in an image on the basis of image data representing the image, and the program has: a preprocessing section that narrows down at least one of a set of images represented by the image data and a set of regions in one of the images to obtain an image or a region that meets a predetermined condition indicating a possible presence of a defect; and a correcting section that detects and corrects the defect in the image or region obtained at the preprocessing step on the basis of the image.

While only basic features of the image correcting apparatus and the image correcting program according to the present invention are described herein in order to avoid repetition, the other features corresponding to the features of the image correcting method, beside the above-described basic features, are included in the image correcting apparatus and program.

Like names such as "preprocessing section" are used to refer to like components of the image correcting apparatus and the image correcting program herein. However, the components of the image correcting program are software performing the functions that their names imply but each component of the image correcting apparatus is a combination of software and hardware.

Each component, such as the preprocessing section of the image correcting program may be implemented by a single program module or a number of program modules. Or, a number of components may be implemented by a single program module. Furthermore, such a component by itself may perform a function or may direct another program or program module installed in the computer to perform a function.

An eye detecting and correcting method of the present invention that achieves the above-described object is a method for detecting an eye in an image on the basis of image data representing the image and, if the eye contains a defect of a predetermined type, correcting the defect, having: a detecting step of detecting an eye in the image and the appearance of the eye on the basis of the image data; and a correcting step of correcting, if a plurality of eyes are detected at the detecting step and any of the plurality of eyes contains the defect, the eye containing the defect with reference to the appearance of the other eyes.

People are sensitive to the image of eyes' appearance. When corrections are made to multiple eyes individually, the resulting appearances of the eyes could not match each other and as a result an odd impression could be created, although the correction made to each individual eye is seemingly adequate.

Therefore, the detecting step of the eye detecting and correcting method of the present invention detects, in addition to eyes, the appearance of the eyes, such as whether or not they are red-eye, gold-eye, closed, or normal dark eyes, the position and size of the eyes, whether or not the other eye of a pair of eyes appears in the image, and the eyes of other people appear in the image. Then, a defect in an eye is corrected with reference to the appearances of the other eyes. As a result, the eye is corrected adequately in such a way that it is in harmony with the appearances of the other eyes.

Preferably, the correcting process corrects a defect in an eye with reference to the appearance of the other eye of the person.

Even a slight difference in appearance between both eyes of a person would create an odd impression. Therefore it is desirable to correct a defect in the eye to be corrected with reference to the other eye to avoid a difference in impression of both eyes.

Furthermore, it may be preferable that the correcting step of the eye detecting and correcting method of the present invention corrects a defect in an eye of a person with reference to the appearance of the eyes of the other people in a picture.

In a group photograph, differences in appearance among the people may cause an odd impression. Therefore, it is desirable to correct a defect in the eye of a person with reference to the appearances of the eyes of the other people in order to avoid differences in appearance among the people.

An eye detecting and correcting apparatus of the present invention that achieves the above-described object is an apparatus for detecting an eye in an image on the basis of image data representing the image and, if the eye contains a defect of a predetermined type, correcting the defect, having: a detecting section that detects an eye in the image and the appearance of the eye on the basis of the image data; and a correcting section that, if a plurality of eyes are detected at the detecting step and any of the plurality of eyes contains the defect, corrects the eye containing the defect with reference to the appearance of the other eyes.

An eye detecting and correcting program storage medium of the invention that achieves the above-described object stores an eye detecting and correcting program for detecting an eye in an image on the basis of image data representing the image and, if the eye contains a defect of a predetermined type, correcting the defect, and the program has: a detecting section that detects an eye in the image and the appearance of the eye on the basis of the image data; and a correcting section that, if a plurality of eyes are detected at the detecting step and any of the plurality of eyes contains the defect, corrects the eye containing the defect with reference to the appearance of the other eyes.

While only basic features of the eye detecting and correcting apparatus and the eye detecting and correcting program according to the present invention are described herein in order to avoid repetition, the other features corresponding to the features of the eye detecting and correcting apparatus, beside the above-described basic features, are included in the eye detecting and correcting apparatus and program.

Like names such as "detecting section" are used to refer to like components of the eye detecting and correcting apparatus and the eye detecting and correcting program herein. However, the components of the eye detecting and correcting program are software performing the functions that their names imply and each component of the eye detecting and correcting apparatus is a combination of software and hardware.

Each component, such as the detecting section of the eye detecting and correcting program may be implemented by a single program module or a number of program modules. Or, a number of components may be implemented by a single program module. Furthermore, such a component by itself may perform a function or may direct another program or program module installed in the computer to perform a function.

According to the present invention, the accuracy of defect correction can be improved without sacrificing efficiency, the processing time can be reduced, and defects in eyes in images can be properly corrected.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Embodiments of the present invention will be described below.

Examples will be described in which an example of the image retouching program of the present invention is incorporated in a personal computer, an embodiment of the image retouching method of the present invention is performed according to the image retouching program, and, as a result, the personal computer operates as an embodiment of an image retouching apparatus of the present invention.

Figure 1:
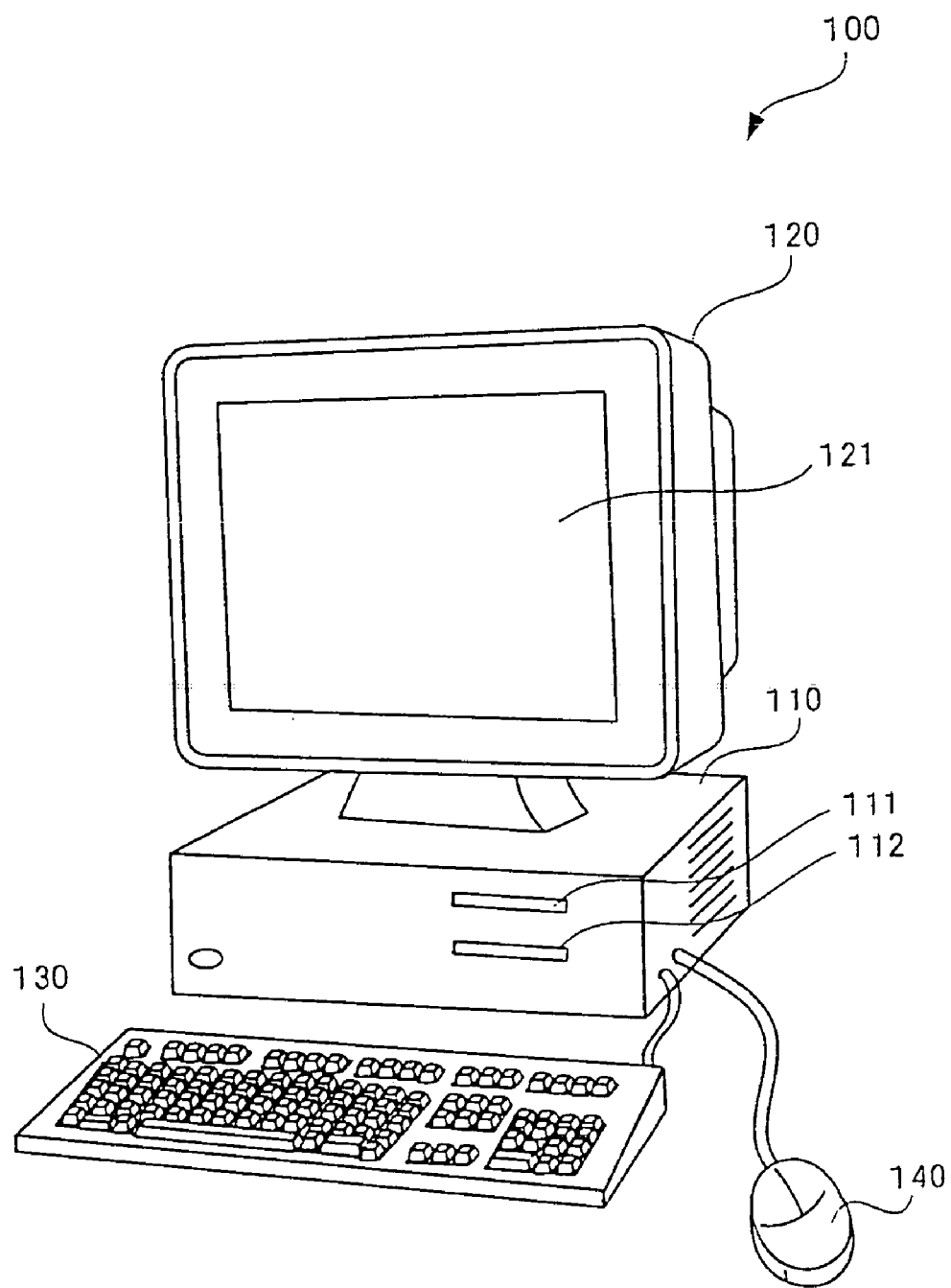
FIG. 1 is an external view of a personal computer to which an embodiment of the present invention is applied.

FIG. 1 is an external view of a personal computer to which an embodiment of the present invention is applied.

The personal computer 100 has a main unit 110 containing a CPU, a RAM memory, a hard disk, and other components, a CRT display 120 that displays images on its phosphor screen 121 according to instructions from the main unit 110, a keyboard 130 for inputting user commands and text information into the personal computer 100, and a mouse 140 for pointing a position on the phosphor screen 121 to input a command associated with that position.

The main unit 110 further includes on the exterior a flexible disk slot 111 that receives a flexible disk and a CD-ROM slot 112 for receiving a CD-ROM and includes a flexible disk drive and a CD-ROM drive that drive a loaded flexible disk or a CD-ROM within it.

In this example, the image retouching program according to the present invention is stored in a CD-ROM, the CD-ROM is inserted into the main unit 110 through the CD-ROM slot 112 and the image retouching program stored on the CD-ROM is installed into the hard disk of the personal computer 100 through the CD-ROM drive. When the image retouching program installed in the hard disk of the personal computer 100 is started, the personal computer 100 operates as an embodiment of the image retouch apparatus of the present invention and performs an embodiment of the image retouching method of the present invention.

According to the present embodiment, image data representing a picture taken by a camera such as a digital still camera is stored in a flexible disk or CD-R, the flexible disk or CD-R is loaded into the personal computer 100 acting as the image retouching apparatus, and the image data is taken into the hard disk. Then, a retouch, such as red-eye correction, which will be described later, is made to the image data and the retouched image is stored in a flexible disk or the hard disk.

Figure 2:
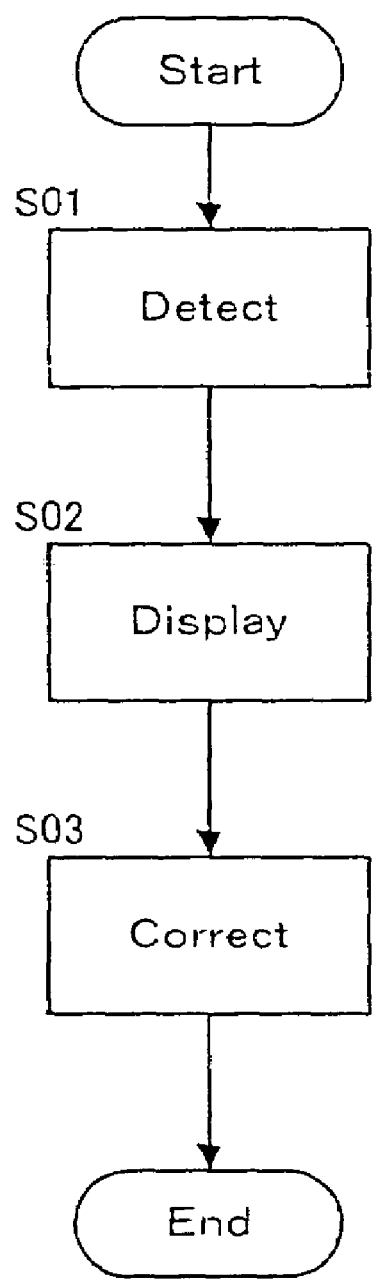
FIG. 2 is a flowchart of an embodiment of an image retouching method according to the present invention.

FIG. 2 is a flowchart showing an embodiment of the image retouching method of the present invention.

The image retouching method includes a detecting step (step S01), a displaying step (step S02), and a retouching step (step S03).

The detecting step is the step of detecting a local defect in an image represented by image data and is an example of the detecting step of the image retouching method of the present invention. A defect in a part of a face is detected as a local defect in the detecting step of the present embodiment. Among defects in face parts, particularly defects known as the red-eye effect and the gold-eye effects are detected.

Furthermore, the displaying step displays a detected defect with a mark corresponding to the type of the defect and receives a correction to an inaccuracy in the detection of a displayed defect. The displaying step therefore is an example of the displaying step of the image retouching method of the present invention. In the present invention, a detected red-eye or gold-eye is displayed with a mark enclosing it.

The retouching step is the step of retouching a detected defect by a retouching method according to the type of defect and is an example of the retouching step of the image retouching method of the present invention. In the present embodiment, red-eye correction and gold-eye correction are performed in this retouching step.

Details of these steps will be described later.

Figure 3:
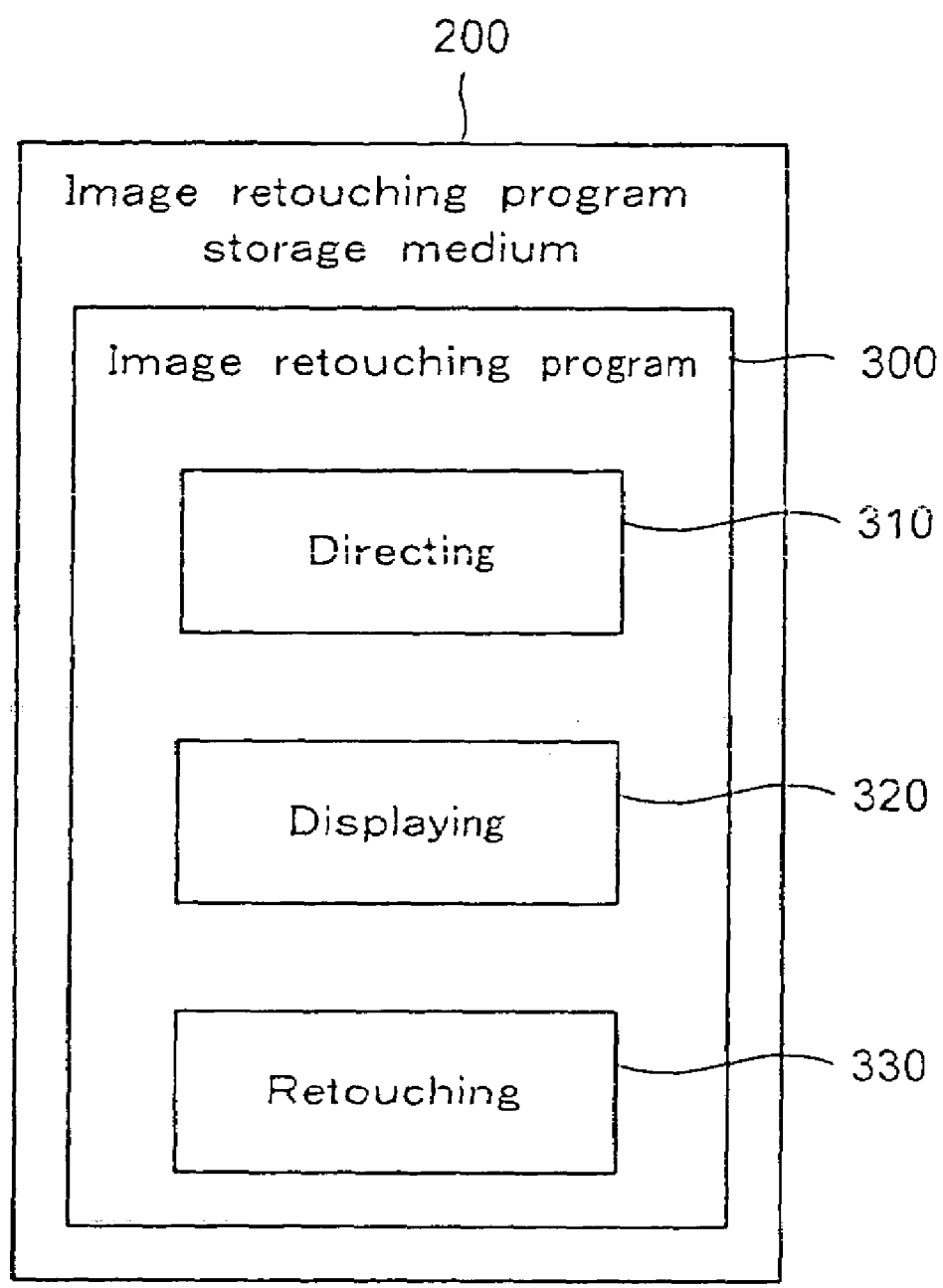
FIG. 3 shows an embodiment of an image retouching program storage medium according to the present invention.

FIG. 3 shows an embodiment of the image retouching program storage medium of the present invention. An image retouching program 300 herein is stored in an image retouching program storage medium 200.

The image retouching program storage medium 200 shown in FIG. 3 may be any type of storage medium on which the image retouching program 300 is stored. For example, if the image retouching program 300 is stored on a CD-ROM, the term image retouching program storage medium 200 refers to that CD-ROM. If the image retouching program 300 is loaded and stored in the hard disk drive, it refers to that hard disk drive. If the image retouching program 300 is downloaded into a flexible disk, DVD, or CD-R, it refers to that flexible disk, DVD, or CD-R.

The image retouching program 300 is executed in the personal computer 100 shown in FIG. 1 and causes the personal computer 100 to operate as an image retouching apparatus for retouching local defects in a picture. The image retouching program 300 has a detecting section 310, a displaying section 320 and a retouching section 330.

The detecting section 310, displaying section 320, and retouching section 330 are responsible for performing the detecting step (step S01), displaying step (step S02), and retouching step (step S03), respectively, shown in FIG. 3. The detecting section 310, displaying section 320, and retouching section 330 are examples of the detecting section, displaying section, and retouching section, respectively, of the image retouching program of the present invention.

Operation of each component of the image retouching program 300 will be described later.

Figure 4:
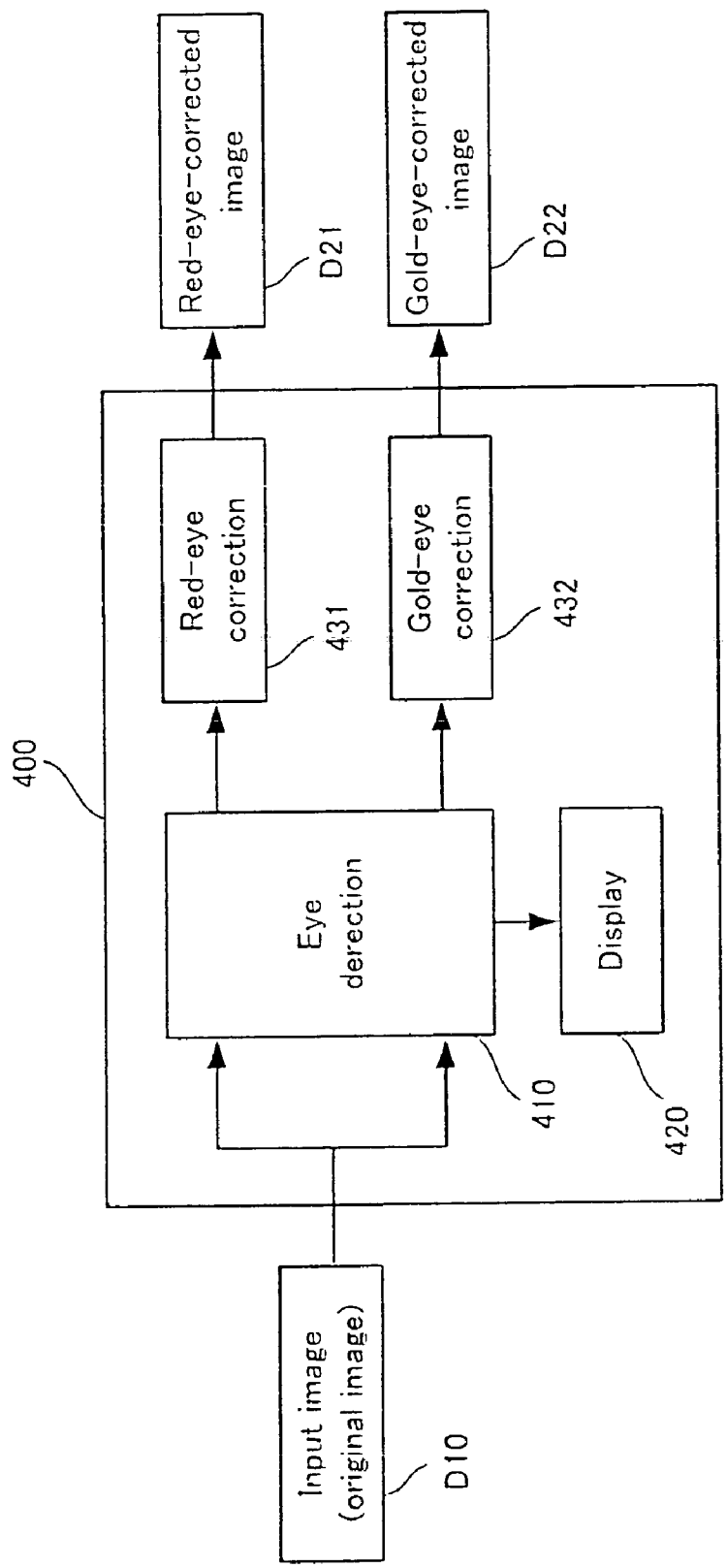
FIG. 4 is a functional block diagram showing an embodiment of the image retouching apparatus according to the present invention.

FIG. 4 is a functional block diagram of an embodiment of the image retouching apparatus of the present invention.

The image retouching apparatus 400 is configured by installing and executing the image retouching program 300 shown in FIG. 3 in the personal computer 100 shown in FIG. 1.

The image retouching apparatus 400 has an eye detecting section 410, a display section 420, a red-eye correcting section 431, and gold-eye correcting section 432. The eye detecting section 410 and the display section 420 correspond to the detecting section 310 and the displaying section 320, respectively, that constitute the image retouching program 300 shown in FIG. 3 and are examples of the detecting section and displaying section of the image retouching apparatus of the present invention. The red-eye correcting section 431 and the gold-eye correcting section 432 shown in FIG. 4 correspond to the retouching section 330 of the image retouching program 300 and are examples of the retouching section of the image retouching apparatus of the present invention. Each component in FIG. 4 is formed by a combination of hardware of the personal computer 100 and an OS and an application program running on the personal computer shown in FIG. 1, whereas each component of the image retouching program shown in FIG. 3 is formed only by the application program.

The components of the image retouching apparatus 400 shown in FIG. 4 will be described along with the steps in the flowchart shown in FIG. 2 and the components of the image retouching program 300 shown in FIG. 3.

Image data D10 taken into the hard disk as described above is inputted in the eye detecting section 410 of the image retouching apparatus 400 in FIG. 4 as a representation of an original image. The eyes of a person in the original image are detected on the basis of the image data D10. During the detection, whether or not any defects such as the red-eye or gold-eye effect are contained is detected with the types of any defects being identified.

In the displaying section 420, an original image represented by the image data is displayed on the CRT display 120 shown in FIG. 1 and a defect detected in the original image is displayed with a mark corresponding to the type of the defect.

Figure 5:
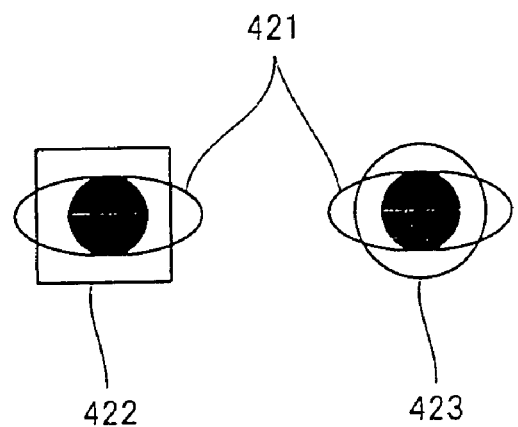
FIG. 5 shows an exemplary display provided by a displaying section.

FIG. 5 shows an exemplary display provided by the display section.

While only the eyes 421 are shown in this exemplary display, actually the entire original image is displayed.

If the red-eye effect is detected in the eyes 421, the pupil of each of the eyes 421 is marked with a box 422, for example, enclosing it to indicate that the red-eye effect is detected. If the gold-eye effect is detected in the eyes 421, the pupil of each of the eyes 421 is marked with a circle 423, for example, enclosing it to indicate that the gold-eye effect is detected. The size of each mark 422, 423 depends on the size of the eye detected.

Because a defect detected is displayed with a mark corresponding to the type of the defect in this way, the user can readily see the result of the detection and therefore high productivity is provided.

Furthermore, if the detection of a defect is incorrect, the user can use the mouse 140 shown in FIG. 1 to correct the error. For example, if detected position differs from the actual position of the defect, the position can be corrected using drag-and-drop. If the type of defect is wrong, a menu for correction can be opened with the click of the right mouse button and the correct type can be selected.

In this way, an incorrect detection can easily be corrected.

An alternative display that is not used in the present embodiment but may be used with the present invention will be described below.

Figure 6:
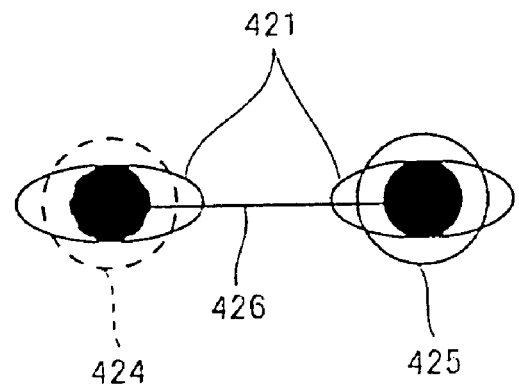
FIG. 6 shows an alternative display provided by the displaying section.

FIG. 6 shows the alternative display.

In this example, if the red-eye effect is detected in the eyes 421, the pupil of each of the eyes 421 is enclosed with a red mark 424, for example, to indicate that the red-eye effect is detected. If the gold-eye effect is detected in the eyes 421, the pupil of each of the eyes 421 is enclosed with a black mark 425 to indicate that the gold-eye effect is detected. In addition, a line 426 interconnecting the pupils of the eyes 421 is displayed. If dots of patterned cloths are erroneously indicated as eyes, the line 426 allows the user to readily notice that error.

As with the exemplary display shown in FIG. 5, an incorrect detection can be corrected in the exemplary display shown in FIG. 6.

Once the result of detection has been displayed by the display section 420 shown in FIG. 4 in this way and a correction, if required, is made to the result, the image data is inputted into the red-eye correcting section 431 or the gold-eye correcting section 432 depending on the type of the defect in the original image. Then the defect is corrected there by using a correcting method appropriate for the defect. For example, if the defect is red-eye, the color saturation of the pupil is reduced to correct it. If the defect is gold-eye, the pupil is filled with an appropriate color selected from a color pallet or with the color of the pupil of the other eye detected as a normal eye. As a result, red-eye-corrected image data D21 representing the image in which the red-eye is corrected or gold-eye-corrected image data D22 representing the image in which the gold-eye is corrected is obtained.

Because the display and, if required, correction is performed in the displaying section as described above, the red-eye-corrected image data D21 or the gold-eye-corrected image data D22 thus obtained represents the image in which the defect such as read-eye or gold-eye is adequately corrected. Consequently, the defect in the original image is accurately corrected in the image retouching apparatus 400.

While the example has been described in which either red-eye or gold-eye is corrected for convenience of explanation, both of red-eye and gold-eye, if they are both detected, are of course corrected.

While the image retouching program stored in a storage medium has been illustrated, the image retouching program may be sent and received over a communication network.

While the image retouching apparatus has been illustrated in which image data stored in a storage medium is captured, the image retouching apparatus of the present invention may capture image data from a digital still camera through connecting means such as USB or may capture image data over a communication network.

While the image retouching apparatus has been illustrated that stores corrected image data in a flexible disk or a hard disk, the image retouching apparatus of the present invention may output corrected image data onto any of other types of storage media such as a CD-R, DVD, and MO, or may output corrected image data to a photograph printer, or may output corrected image data over a communication network.

While red-eye and gold-eye are used as examples of local defects in the foregoing description, local defects herein may be defects in any other facial parts such as a mouth or eyebrow, any other flaws such as scratches or local underexposures in all the area other than facial parts.

Another example will be described below in which an embodiment of the image correcting program of the present invention is loaded into a personal computer, an embodiment of the image correcting method of the present invention is performed according to the image correcting program on the personal computer, and, as a result, the personal computer operates as an embodiment of the image correcting apparatus of the present invention.

In the present embodiment, the image correcting program according to the present invention is stored in a CD-ROM, the CD-ROM is inserted in the main unit 110 through the CD-ROM slot 112 shown in FIG. 1, and the image correcting program stored on the CD-ROM is installed into the hard disk of the personal computer 100 through the CD-ROM drive. When the image correcting program installed in the hard disk of the personal computer 100 is started, the personal computer 100 operates as an embodiment of the image correcting apparatus of the present invention and performs an embodiment of the image correcting method of the present invention.

According to the present embodiment, image data representing a picture taken by a camera such as a digital still camera is stored in a flexible disk or CD-ROM, the flexible disk or CD-ROM is loaded into the personal computer 100 acting as the image correcting apparatus, and the image data is captured into the hard disk. Then, image processing is applied to the captured image data, such as red-eye correction that detects the red-eye effect, which is a red appearance of a pupil caused by light from a camera flash reflecting from the retina of a person during flash photography, and alters the red-eye to a dark eye. The processed image data is stored on a flexible disk or a hard disk.

Figure 7:
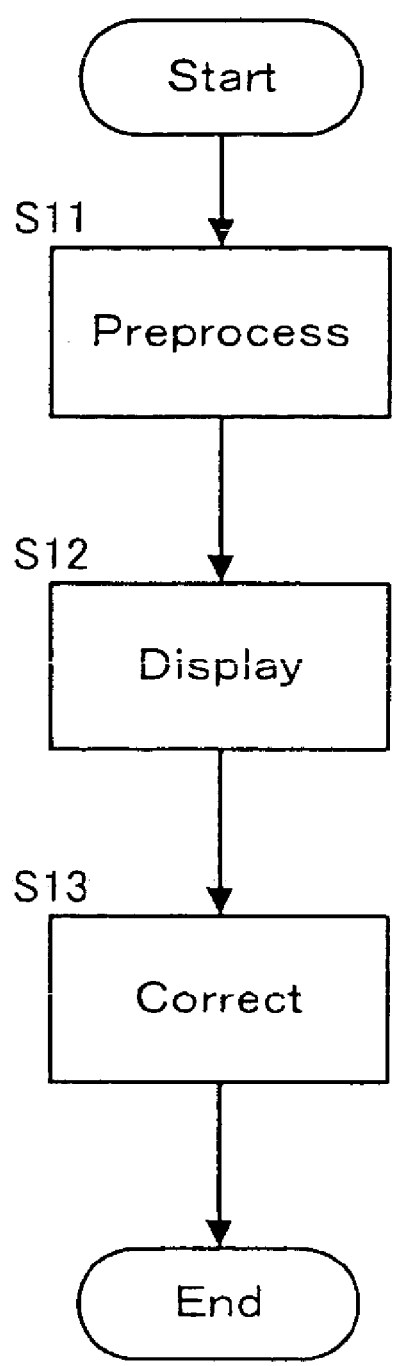
FIG. 7 is a flowchart of a first embodiment of the image correction method.

FIG. 7 is a flowchart illustrating a first embodiment of the image correcting method.

The image correcting method has a preprocessing step (step S11), a displaying step (step S12), and correcting step (step S13).

The preprocessing step is the step of narrowing down images that meet predetermined conditions indicating that a defect can be contained and represents an example of the preprocessing step of the image correcting method of the present invention. In the preprocessing step of the present embodiment, preprocessing is applied to images and the probability of the red-eye effect is determined on the basis of information on shooting.

The displaying step displays the images narrowed down in the preprocessing and corresponds to one example of the displaying step of the image correcting method of the present invention. However, this displaying step is optional in the present invention.

The correcting step detects and corrects a defect in the images narrowed down in the preprocessing and corresponds to one example of the correcting step of the image correcting method of the present invention. According to the present embodiment, red-eye is detected and corrected in the correcting step.

Details of these steps will be described later.

Figure 8:
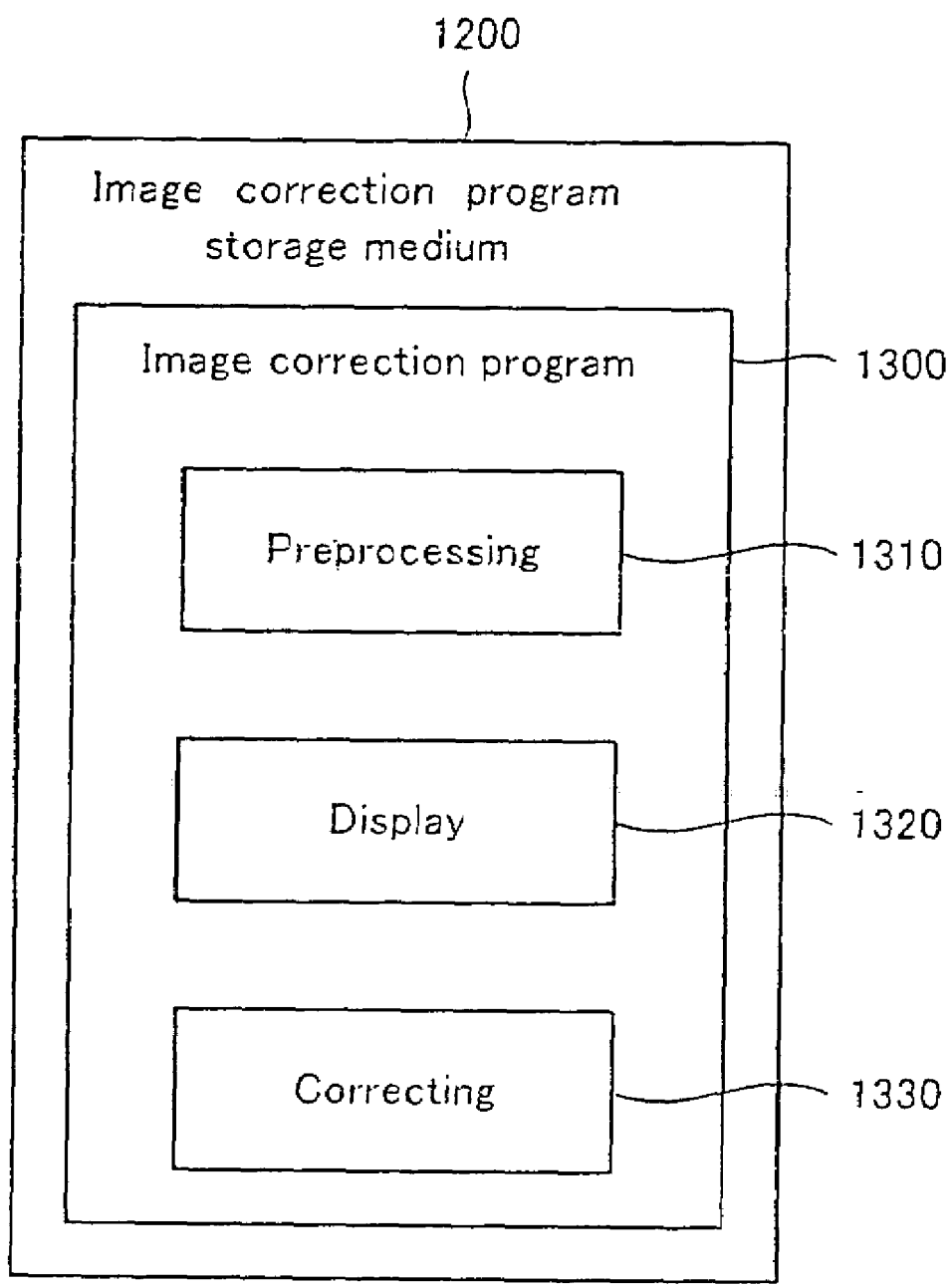
FIG. 8 shows the first embodiment of the image correction program storage medium of the present invention.

FIG. 8 shows a first embodiment of the image correcting program storage medium of the present invention. An image correcting program 1300 herein is stored in an image correcting program storage medium 1200.

The image correcting program storage medium 1200 shown in FIG. 8 may be any types of storage media on which image correcting program 1300 is stored. For example, if the image correcting program 1300 is stored on a CD-ROM, the term image correcting program storage medium 1200 refers to that CD-ROM. If the image correcting program 1300 is loaded and stored in the hard disk drive, it refers to that hard disk drive. If the image correcting program 1300 is downloaded into a flexible disk, DVD, or CD-R, it refers to that flexible disk, DVD, or CD-R.

The image correcting program 1300 is executed in the personal computer 100 shown in FIG. 1 and causes the personal computer 100 to operate as an image correcting apparatus for detecting and correcting red-eye in a picture. The image correcting program 1300 has a preprocessing section 1310, a display section 1320, and a correcting section 1330.

The preprocessing section 1310, display section 1320, and correcting section 1330 are responsible for performing the preprocessing step (step S11), the displaying step (steps S12), and the correcting step (step S13), respectively, shown in FIG. 7. Furthermore, the preprocessing section 1310, display section 1320, and correcting section 1330 correspond to examples of the preprocessing section, display section, and correcting section, respectively, of the image correcting program of the present invention.

Operations of the components of the image correcting program 1300 will be described later.

Figure 9:
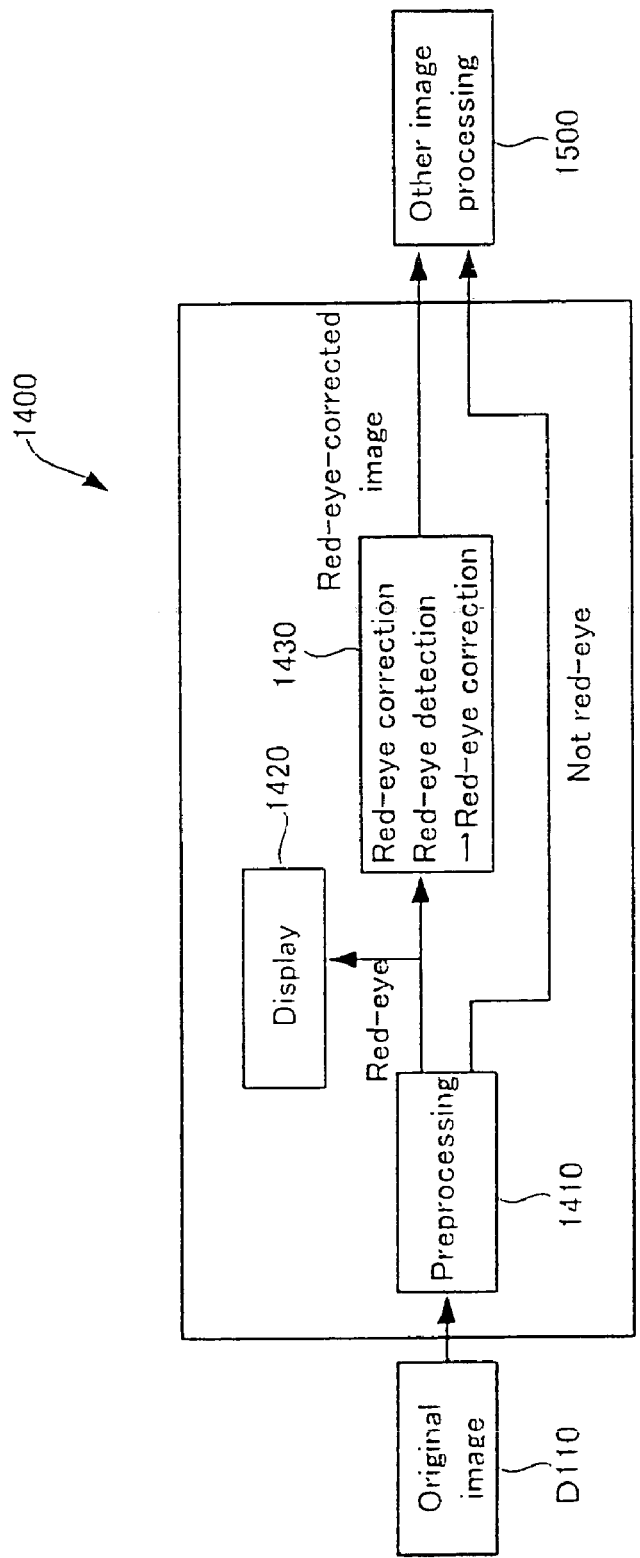
FIG. 9 is a functional block diagram showing the first embodiment of an image correction apparatus of the present invention.

FIG. 9 is a functional block diagram of a first embodiment of the image correcting apparatus of the present invention.

The image correcting apparatus 1400 is configured by installing and executing the image correcting program 1300 shown in FIG. 8 in the personal computer 100 shown in FIG. 1.

The image correcting apparatus 1400 has a preprocessing section 1410, a display section 1420, and a correcting section 1430. The preprocessing section 1410, display section 1420, and correcting section 1430 correspond to the preprocessing section 1310, display section 1320, and correcting section 1330, respectively, of the image correcting program 1300 shown in FIG. 8 and are an example of the preprocessing section, display section, and correcting section of the image correcting apparatus of the present invention. Each of the components shown in FIG. 9 is formed by a combination of hardware of the personal computer 100 and an OS and an application program running on the personal computer, whereas each component shown in FIG. 8 is formed only by the application program.

The components of the image correcting apparatus 1400 shown in FIG. 9 will be described along with the steps of the flowchart shown in FIG. 7 and the components of the image correcting program 1300 shown in FIG. 8.

Image data D110 representing multiple original images is inputted in the preprocessing section 1410 and original images that are likely to contain the red-eye effect are narrowed down on the basis of shooting information attached to the image data D110. The image data D110 herein is captured by a digital still camera. Attached to the image data D110 is shooting information such as information concerning Exif, the flash on/off, the shutter speed, the f number, the exposure value, the lens-to-subject distance, the shooting mode, the top and bottom of the picture, the time stamp when the picture was taken, and the model of the camera. The preprocessing section 1410 uses this shooting information to narrow down original images to correct. For example, if the flash on/off information indicates the off state, or the shutter speed is high and the exposure value is also high, or the f number is small and the time stamp indicates daytime, or the lens-to-subject distance exceeds an effective range, or the shooting mode is landscape mode, then it is unlikely that the red-eye effect occurs. Therefore, pictures taken in these conditions are excluded from candidates for correction of red-eye correction. On the other hand, if the model of the camera that is apt to cause red-eye and the flash on/off information indicates the on state, the pictures are subject to red-eye correction. This preprocessing in the preprocessing section 1410 can be performed fast by a simple determination routine, therefore subject images can efficiently be narrowed down in a short processing time, even if the number of determination conditions is large. The purpose of the preprocessing in the preprocessing section 1410 is to minimize waste in the subsequent correcting process, rather than to precisely determine whether or not red-eye has occurred in the images. The minimum conditions for determining whether red-eye is absolutely not contained or red-eye can be contained even slightly are used to prevent erroneous determination.

The result of the preprocessing in the preprocessing section 1410 is displayed on the CRT display 120 shown in FIG. 1 by the display section 1420 for confirmation.

Figure 10:
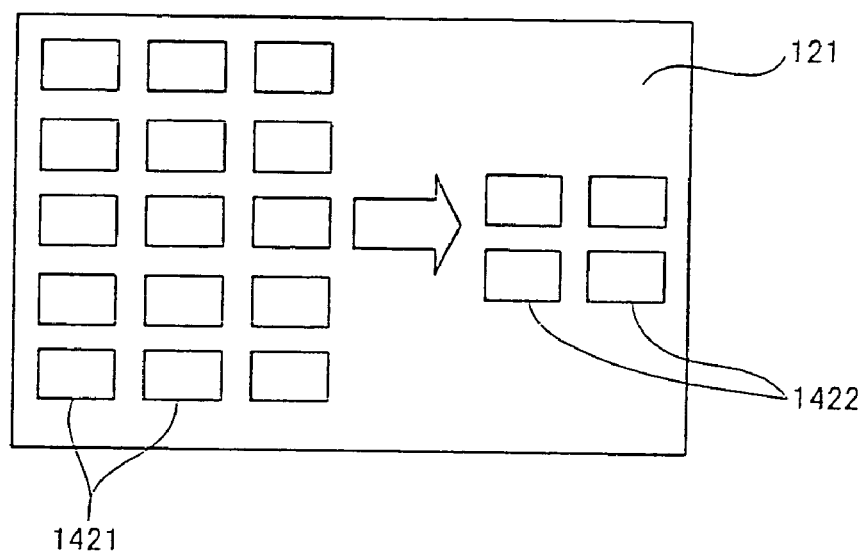
FIG. 10 shows an exemplary display resulting from preprocessing.

FIG. 10 shows an exemplary display of the result of preprocessing.

The phosphor screen 121 of the CRT display is shown in FIG. 10. Displayed on the phosphor screen 121 are the thumbnails of all original images 1421 inputted for preprocessing and thumbnails of the original images 1422 selected through the preprocessing.

If the operator can determine with certainty that obviously none of the selected original images 1422 displayed as shown contains red-eye, then the operator performs a predetermined cancel operation to exclude all the original images from the candidates for red-eye correction. This check may be easy to accomplish because the number of images to check is reduced through the preprocessing.

If the operator cannot determine with certainty whether or not none of the images is likely to contain red-eye, then the operator performs a predetermined operation proceeds to continue the process and the selected original images 1422 are provided to the correcting section 1430 shown in FIG. 9.

An alternative display that is not used in the present embodiment but may be used with the present invention will be described below.

Figure 11:
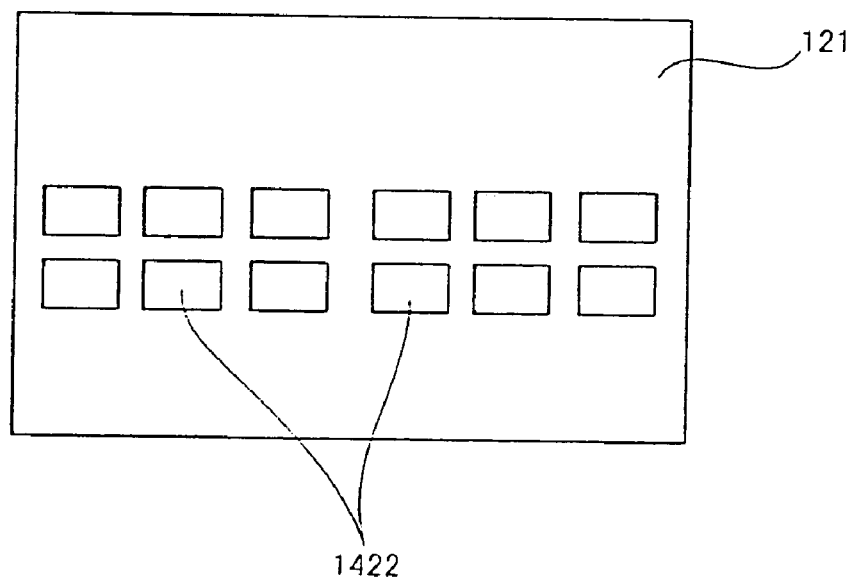
FIG. 11 shows an alternative display resulting from preprocessing.

FIG. 11 shows the alternative display of a result of preprocessing.

In the exemplary display shown in FIG. 11, only the original images 1422 selected through the preprocessing are displayed on the phosphor screen 121.

In this alternative display, the same check as in the exemplary display shown in FIG. 10 is performed.

The original images displayed by the display section 1420 shown in FIG. 9 and checked by the operator are provided to the correcting section 1430, where they are checked for red-eye and red-eye, if any, is corrected. How the correcting process is performed is not the subject of the present invention and therefore the description will be omitted. A technique disclosed in Japanese Patent Laid-Open No. 2000-76427, for example, may be used. The processing time in the correcting section 1430 is reduced and the probability of erroneous detection of the red-eye effect is also decreased because the list of images to be subjected to the correcting process is narrowed down in the preprocessing section 1410.

The red-eye corrected images resulting from the correcting process in correcting section 1430 and the original images (Not red-eye) excluded by the preprocessing section 1410 from the candidates for correction are provided to other image processing stages 1500 such as color processing and sharpness processing, which are performed separately from the image correcting apparatus 1400 in the personal computer 100 shown in FIG. 1.

A second embodiment, which differs from the embodiment described above, will be described below.

In the second embodiment, an example of the image correcting program of the present invention is installed in a personal computer, an embodiment of the image correcting method of the present invention is performed on the personal computer according to the image correcting program and, as a result, the personal computer operates as an embodiment of the image correcting apparatus of the present invention.

Again with reference to FIGS. 7 and 8, the second embodiment of the image correcting method of the present invention and the second embodiment of the image correcting program of the present invention will be described.

In the second embodiment of the image correcting method of the present invention, the regions of a picture are preprocessed to narrow down regions on the basis of shooting information and scene analysis in a preprocessing step (step S11), which replaces the preprocessing step in the first embodiment. The narrowed down regions are displayed in a displaying step (step S12), which replaces the displaying step in the first embodiment.

The image correcting program stored in the second embodiment of the image correcting program storage medium of the present invention has a preprocessing section 1310 and a display section 1320, which replace the preprocessing section and the display section of the first embodiment and correspond to the preprocessing step for narrowing down regions and the displaying step for displaying the narrowed down regions.

Figure 12:
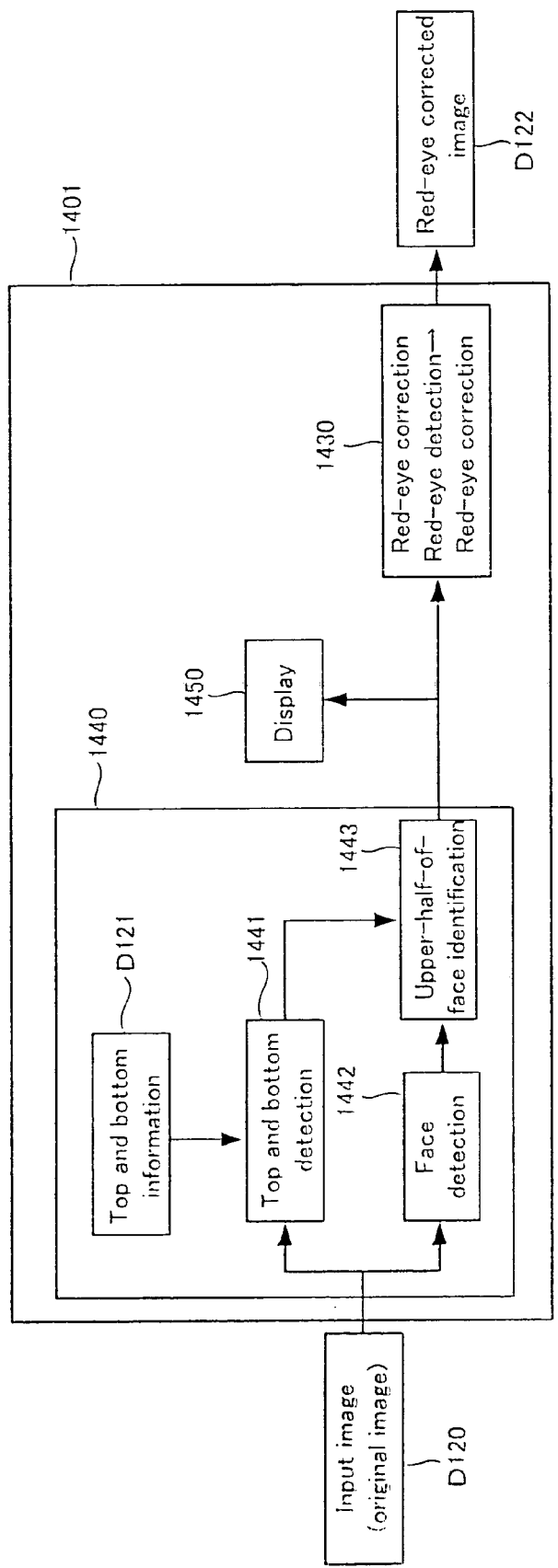
FIG. 12 is a functional block diagram of a second embodiment of the image correction apparatus of the present invention.

FIG. 12 is a functional block diagram showing a second embodiment of the image correcting apparatus of the present invention.

The image correcting apparatus 1401 is configured by installing and executing the image correcting program of the second embodiment in the personal computer 100 shown in FIG. 1.

The image correcting apparatus 1401 has a preprocessing section 1440, a display section 1450, and a correcting section 1430. The preprocessing section 1440, display section 1450, and correcting section 1430 are an example of the preprocessing section, display section, and correcting section, respectively, of the image correcting apparatus of the present invention. The correcting section 1430 in FIG. 12 is exactly the same as the correcting section 1430 shown in FIG. 9.

The components of the image correcting section 1401 shown in FIG. 12 will be described below.

Image data D120 representing an original image is inputted in the preprocessing section 1440 along with top and bottom information D121 attached to the image data. The top and bottom of the image is detected by a top and bottom detecting section 1441 on the basis of the image data D120 and the top and bottom information D121. In addition, in a face detecting section 1442, scene analysis based on the image data D120 is used to detect the region containing the face of a person in the original image. Then, an upper-half-of-face detecting section 1443 identifies the region of the upper half of the face on the basis of the top and bottom information detected by the top and bottom detecting section 1441 and the face region detected by the face detecting section 1442. In this way, the region in which red-eye correction is to be applied is substantially narrowed. Images in which no face is detected in the preprocessing section 1440 are provided to other image processing stages such as color processing.

The display section 1450 displays the region identified on the CRT display 120 shown in FIG. 1.

Figure 13:
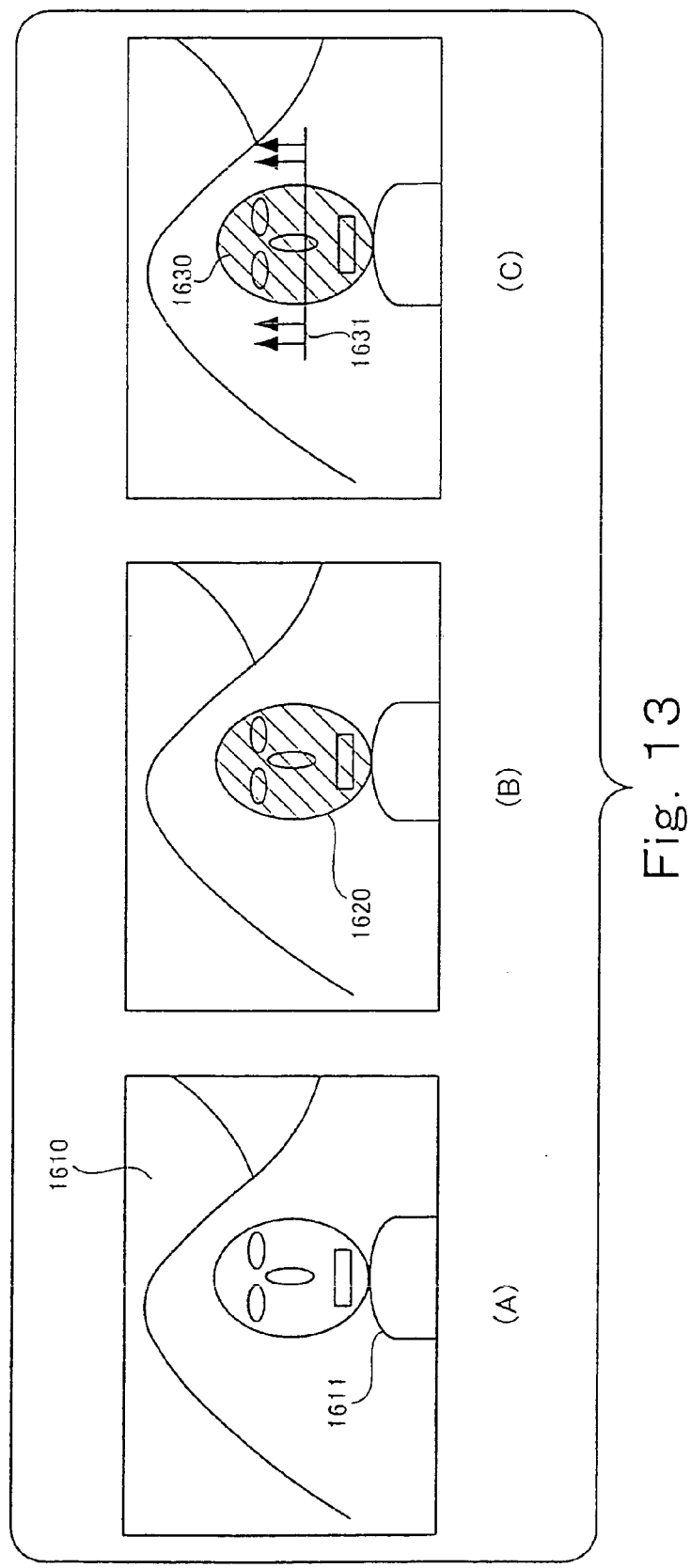
FIG. 13 shows an example of an original image in part (A), a face region detected in part (B), and an exemplary display resulting from preprocessing in part (C)

FIG. 13 shows an example of an original image in part (A), a detected face region in part (B), and an exemplary display of the result of preprocessing in part (C).

The original image 1610 shown in part (A) of FIG. 13 is an example of original image represented by the image data D120 shown in FIG. 12 and contains an image of a person 1611 shown in part (A).

In part (B) of FIG. 13, the face area 1620 detected by scene analysis based on the original image 1610 shown in part (A) is indicated with a diagonally shaded pattern.

In part (C) of FIG. 13, the upper half 1630 of the face area 1620 shown in part (B) is indicated with a separating mark 1631. The image indicated in part (C) is displayed on the CRT display by the display section. The operator can check the displayed image to see if the preprocessing is properly performed.

The image data representing the original image shown in FIG. 12, in which the region that may be subject to correction has been narrowed down by the preprocessing section 1440 and which has been displayed by the display section 1450, with the subject region of correction being specified, is sent to the correcting section 1430, where the red-eye correction described above is applied to the subject region of correction. The time required for the red-eye correction is significantly reduced because the region that is subject to correction has been substantially reduced in the preprocessing section 1440.

The red-eye correction by the correcting section 1430 results in image data D122 representing a red-eye-corrected image with the corrected red-eye. The image data D122 is provided to other image processing stages as described with respect to the first embodiment.

While red-eye is used as an example of defects appearing in the image of eyes in the foregoing description, problems concerning eye images may be any other defects such as gold-eye and closed eyes.

While the face detection and the top and bottom detection are illustrated as an example of scene analysis, flash photography detection may be used for scene analysis so that images that are likely to be taken with flash may be selected as images to be corrected.

While the image correcting program stored in a storage medium has been taken as an example in the foregoing description, the image correcting program may be sent and received over a communication network.

While the image correcting apparatus has been described that captures image data stored in a storage medium, the image correcting apparatus of the present invention may obtain image data from a digital still camera through connecting means such as USB or may obtain image data over a communication network.

While the example has been provided in which processed image data is stored in a flexible disk or hard disk, the processed image data may be outputted to any other kinds of storage medium such as a CD-R, DVD, and MO, or outputted to a photograph printer, or outputted over a communication network.

While the example has been provided in which other image processing is performed after image correction according to the embodiment of the present invention is performed in the personal computer, image correction according to the present invention may be separately performed on a personal computer dedicated to it.

Another example will be described below in which an example of the eye detecting and correcting program of the present invention is installed in a personal computer, an embodiment of the eye detecting and correcting method of the present invention is performed on the personal computer according to the eye detecting and correcting program and, as a result, the personal computer operates as an embodiment of the eye detecting and correcting apparatus of the present invention.

In this example, the eye detecting and correcting program according to the present invention is stored in a CD-ROM, the CD-ROM is inserted into the main unit 110 of the personal computer 100 through the CD-ROM slot 112 shown in FIG. 1, and the eye detecting and correcting program stored on the CD-ROM is installed in the hard disk of the personal compute 100 through a CD-ROM drive. When the eye detecting and correcting program installed in the hard disk of the personal computer 100 is started, the personal computer 100 operates as an embodiment of the eye detecting and correcting apparatus of the present invention and performs an embodiment of the eye detecting and correcting method of the present invention.

In the present embodiment, image data representing a picture taken by a digital still camera is stored in a flexible disk or a CD-R, the flexible disk or CD-R is inserted into the personal computer 100 serving as the eye detecting and correcting apparatus, and the image data is read into the hard disk. The read image data is subjected to correction such as red-eye correction, which will be described later, and the corrected image data is stored in a flexible disk or the hard disk.

Figure 14:
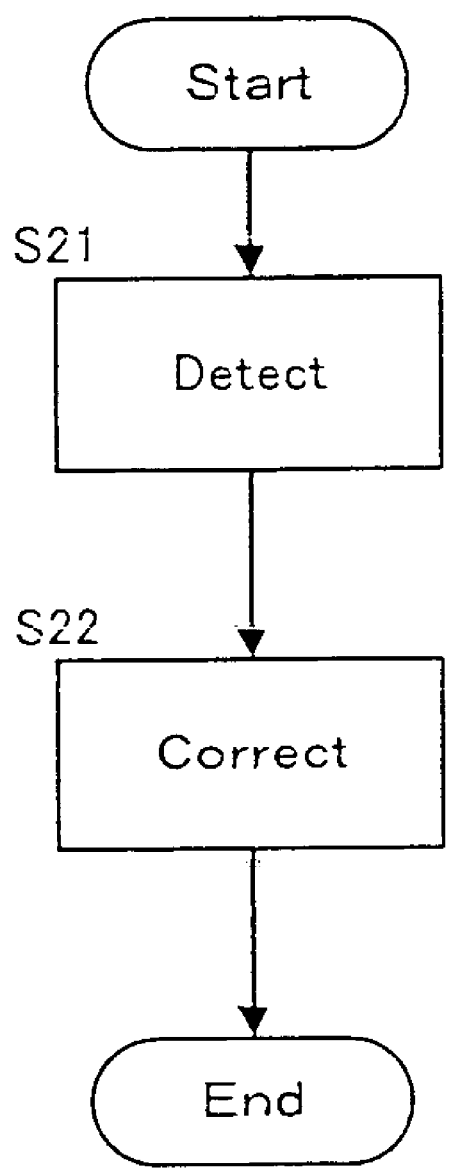
FIG. 14 is a flowchart of an embodiment of an eye detection and correction method of the present invention.

FIG. 14 is a flowchart illustrating an embodiment of the eye detecting and correcting method of the present invention.

The eye detecting and correcting method has a detecting step (step S21), a correcting step (step S22).

The detecting step detects an eye in an image represented by the image data and detects the status of the eye. This step represents an example of the detecting step of the eye detecting and correcting method of the present invention. Examples of the appearance of an eye include features of the eyes that indicate a dark eye, red-eye, or gold-eye, the size and position of the eye, and whether or not the other eye of the pair of eyes is contained.

If a defect appears in a detected eye, the correcting step corrects the defect with reference to the other eye. This step represents an example of the correcting step of the eye detecting and correcting method of the present invention. In the present embodiment, an eye to be corrected is corrected with reference to the appearance of the other eye of the person as well as the eyes of another person in the image.

Details of these steps will be described later.

Figure 15:
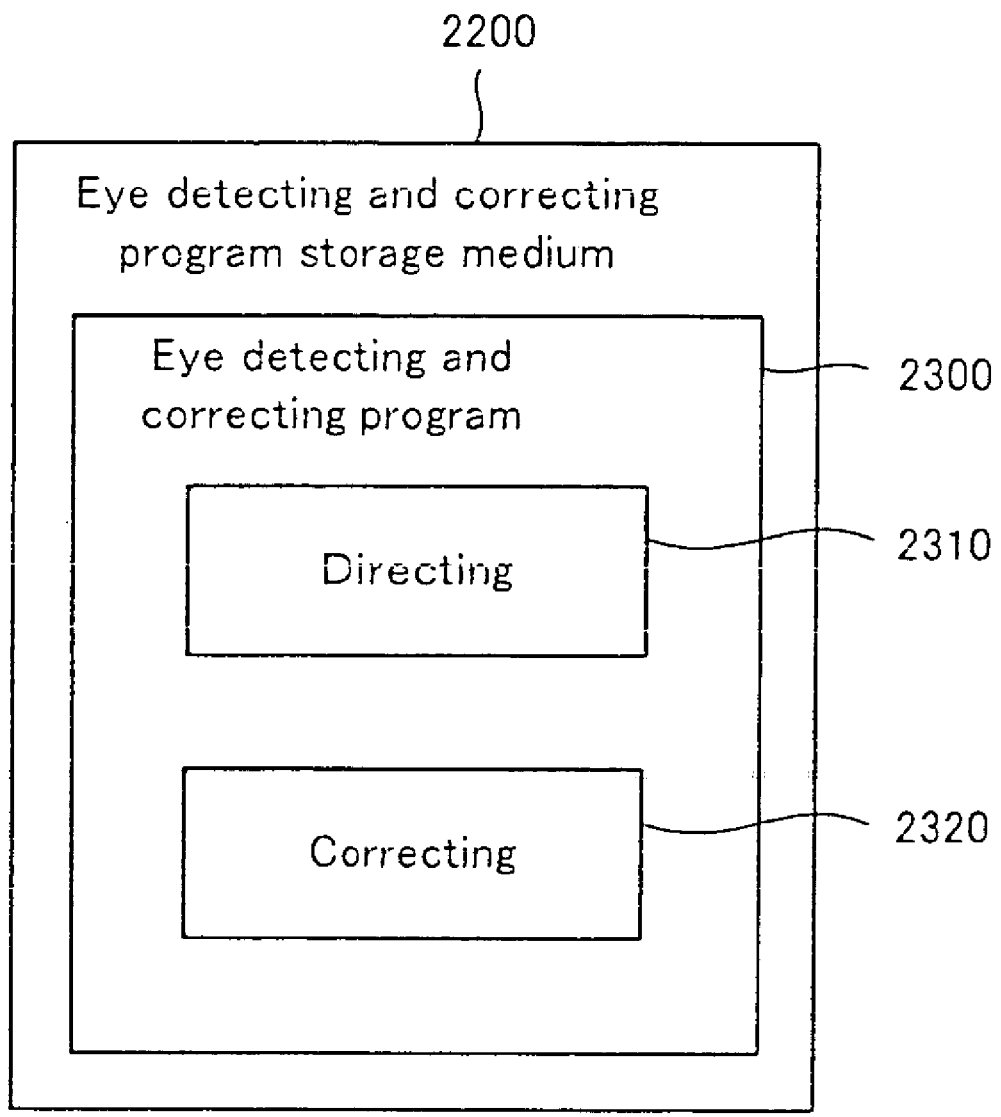
FIG. 15 shows an embodiment of an eye detection and correction program storage medium of the present invention.

FIG. 15 shows an embodiment of the eye detecting and correcting program storage medium of the present invention. An eye detecting and correcting program 2300 herein is stored in an eye detecting and correcting program storage medium 2200.

The eye detecting and correcting program storage medium 2200 shown in FIG. 15 may be any types of storage media on which eye detecting and correcting program 2300 is stored. For example, if the eye detecting and correcting program 2300 is stored on a CD-ROM, the term eye detecting and correcting program storage medium 2200 refers to that CD-ROM. If the eye detecting and correcting program 2300 is loaded and stored in the hard disk drive, it refers to that hard disk drive. If the eye detecting and correcting program 2300 is downloaded into a flexible disk, DVD, or CD-R, it refers to that flexible disk, DVD, or CD-R.

The eye detecting and correcting program 2300 is executed in the personal computer 100 shown in FIG. 1 and causes the personal computer 100 to operate as an eye detecting and correcting apparatus that corrects defects in eyes in images. The eye detecting and correcting program 2300 has a detecting section 2310 and a correcting section 2320.

The detecting section 2310 and the correcting section 2320 are responsible for performing the detecting step (step S21) and the correcting step (step S22), respectively, shown in FIG. 14. The detecting section 2310 and the correcting section 2320 are an example of the detecting section and the correcting section of the eye detecting and correcting program, respectively, of the present invention.

Operations of the components of the eye detecting and correcting program 2300 will be described later.

Figure 16:
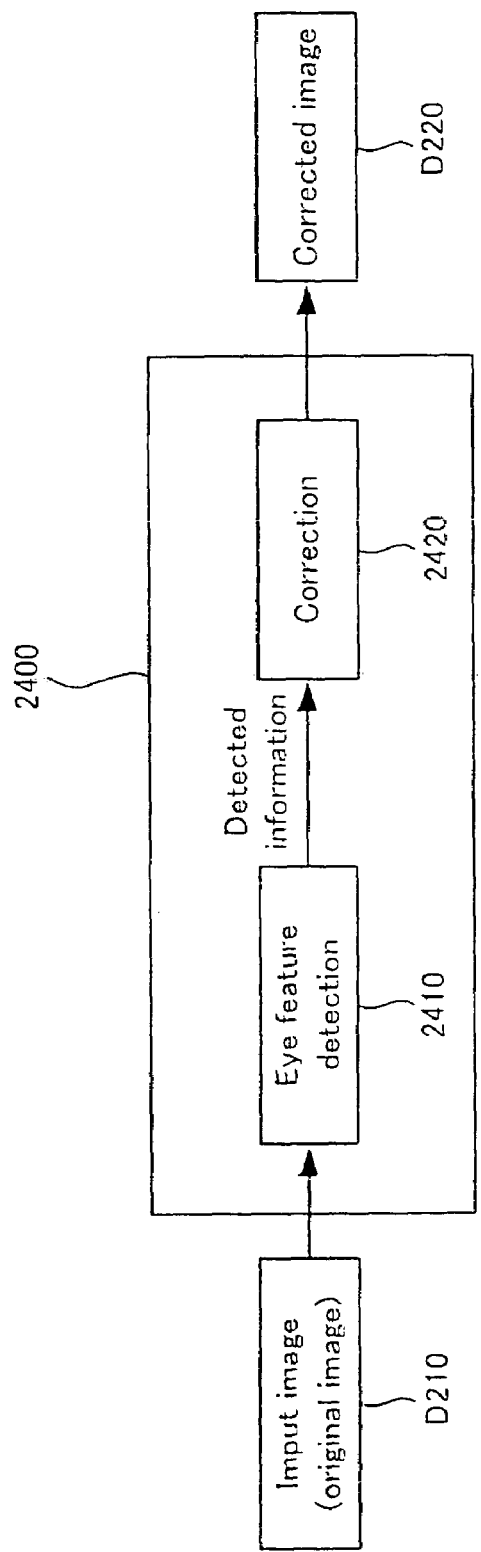
FIG. 16 is a functional block diagram showing an embodiment of an eye detection and correction apparatus.

FIG. 16 is a functional block diagram showing an embodiment of the eye detecting and correcting apparatus.

The eye detecting and correcting apparatus 2400 is configured by installing and executing the eye detecting and correcting program 2300 shown in FIG. 15 in the personal computer 100 shown in FIG. 1.

The eye detecting and correcting apparatus 2400 has a detecting section 2410 and a correcting section 2420. The detecting section 2410 and the correcting section 2420 correspond to the detecting section 2310 and the correcting section 2320, respectively, that constitute the eye correcting and detecting program 2300 shown in FIG. 15 and are an example of each of the detecting section and the correcting section of the eye detecting and correcting apparatus of the present invention. Each of the components shown in FIG. 16 is formed by a combination of hardware of the personal computer 100 and an OS and an application program running on the personal computer shown in FIG. 1, whereas each component of the eye detecting and correcting program shown in FIG. 15 is formed only by the application program.

The components of the eye detecting and correcting apparatus 2400 shown in FIG. 16 will be described along with the steps of the flowchart shown in FIG. 14 and the components of the eye detecting and correcting program 2300 shown in FIG. 15.

Imaged data D210 captured into the hard disk as describe above is inputted as data representing an original image in the detecting section 2410 of the eye detecting and correcting apparatus 2400 shown in FIG. 16. The eyes of a person in the original image are detected on the basis of the image data D210. The detecting section 2410 also detects features of each eye, such as dark-eye, red-eye, or gold-eye, the size and position of the eye, and the presence or absence of the other eye of the pair of eyes.

The information thus detected is sent to the correcting section 2420 together with the original image. If the feature of the eye indicates red-eye, the correcting section 2420 corrects the red-eye to generate image data D220 representing the corrected image. The image data D220 is stored in a flexible disk or the hard disk as described above.

In correcting by the correcting section 2420, the appearance of eyes other than the eye to be corrected is referenced.

Figure 17:
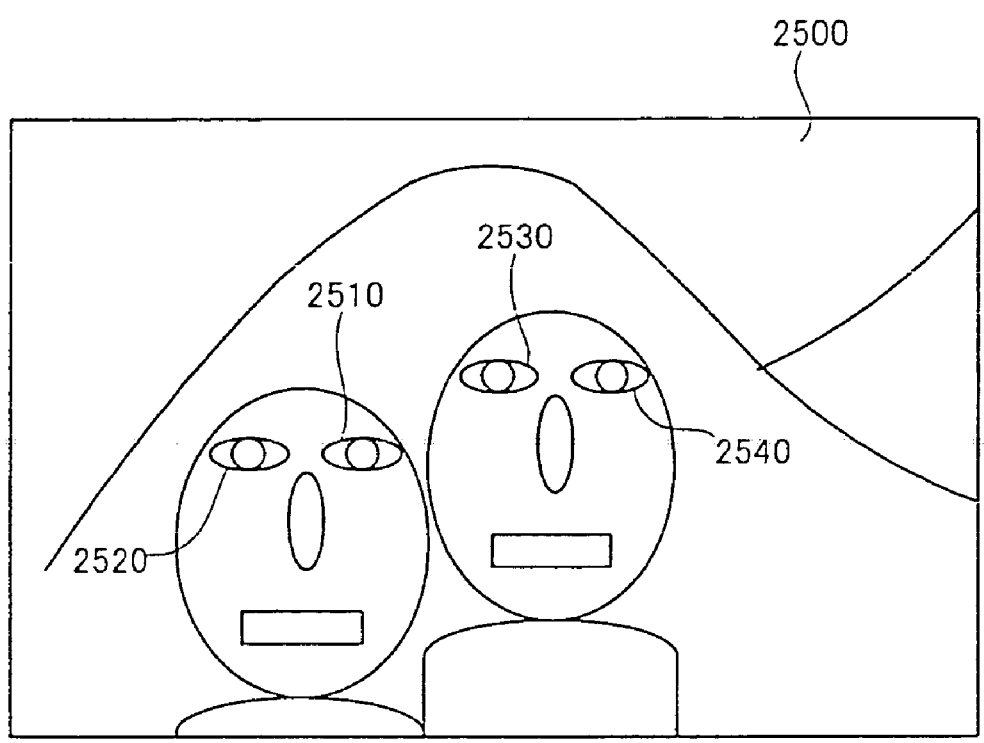
FIG. 17 shows an example of correction.

FIG. 17 shows an example of correction.

In FIG. 17, an example of an original image 2500 is shown. Two people appear in the original image 2500. Among the four eyes, one eye 2510 shows red-eye. The other eye 2520 of the person and the eyes 2530 and 2540 of the other person are dark and normal.

In order to correct the red-eye 2510, the appearances of the other eyes are first referenced to and the other eye 2520 of the pair is found and the feature of the eye 2520 is referenced. Because the eye 2520 is a normal, dark eye, the tint of the red eye is corrected so as to match the tint of the dark eye, such as black or brown. In particular, the color saturation of the red eye is reduced to correct it to a brown or dark eye. Then, the lightness of the eye 2510 to be corrected is adjusted so that the balance between the lightnesses of the pair of eyes 2510 and 2520 matches the balance between the lightnesses of the eyes 2530 and 2540 of the other person.

If both eyes of a person are red-eye, the correcting section 2420 in FIG. 16 correct both eyes so that the tints of the pair of eyes match each other.

In this way, oddness due to a difference in impression between multiple eyes can be avoided by the correction and thus defects in eyes can properly be corrected.

While red-eye is used as an example of defects appearing in the image of eyes in the foregoing description, problems concerning eye images may be any other defects such as gold-eye and closed eyes.

While the eye detecting and correcting program stored in a storage medium has been taken as an example in the foregoing description, the eye detecting and correcting program may be sent and received over a communication network.

While the eye detecting and correcting apparatus has been described that captures image data stored in a storage medium, the eye detecting and correcting apparatus of the present invention may obtain image data from a digital still camera through connecting means such as USB or may obtain image data over a communication network.

While the example has been provided in which corrected image data is stored in a flexible disk or hard disk, the corrected image data may be outputted to any other kinds of storage medium such as a CD-R, DVD, and MO, or outputted to a photograph printer, or outputted over a communication network.

What is claimed is:

1. An image retouching method comprising:
   a detecting step of detecting a local defect in an original image and distinguishing the type of the defect on the basis of image data representing the original image;
   a displaying step of displaying the defect detected at the detecting step with a mark corresponding to the type of the defect and receiving a correction to an inaccuracy in the detection of the defect displayed; and
   a retouching step of retouching the image data representing the original image according to the type of the defect of which any detection inaccuracy is corrected.

2. The image retouching method according to claim 1, wherein the detecting step detects a defect in a facial part in the original image.

3. The image retouching method according to claim 1, wherein the detecting step detects a defect in an eye in the original image.

4. An image retouching apparatus comprising:
   a detecting section that detects a local defect in an original image and distinguishes the type of the defect on the basis of image data representing the original image;
   a display section that displays the defect detected at the detecting step with a mark corresponding to the type of the defect and receives a correction to an in accuracy in the detection of the defect displayed; and
   a retouching section that retouches the image data representing the original image according to the type of the defect of which any detection inaccuracy is corrected.

5. A computer program product, including computer-readable media comprising instructions to implement procedures for an image retouching program, said procedure comprising:

a detecting instruction that detects a local defect in an original image and distinguishes the type of the defect on the basis of image data representing the original image;

a display instruction that displays the defect detected at the detecting step with a mark corresponding to the type of the defect and receives a correction to an in accuracy in the detection of the defect displayed; and a retouching instruction that retouches the image data representing the original image according to the type of the defect of which any detection inaccuracy is corrected.

6. An image correcting method for detecting and correcting a particular defect in an eye in an image on the basis of image data representing the image, comprising:

a preprocessing step of narrowing down at least one of a set of images represented by the image data and a set of regions in one of the images to obtain an image or a region that meets a predetermined condition indicating a possible presence of a defect; and a correcting step of detecting and correcting the defect in the image or region obtained at the preprocessing step on the basis of the image.

7. The image correcting method according to claim 6, wherein the image data representing a photograph has shooting information obtained during shooting and attached to the image data; and the preprocessing step performs preprocessing according to the shooting information attached to the image data.

8. The image correcting method according to claim 6, wherein the preprocessing step performs preprocessing on the basis of scene analysis of the image represented by the image data.

9. An image correcting apparatus for detecting and correcting a particular defect in an eye in an image on the basis of image data representing the image, comprising:

a preprocessing section that narrows down at least one of a set of images represented by the image data and a set of regions in one of the images to obtain an image or a region that meets a predetermined condition indicating a possible presence of a defect; and a correcting section that detects and corrects the defect in the image or region obtained at the preprocessing step on the basis of the image.

10. A computer program product, including computer-readable media comprising instructions to implement procedures for an image correction program for correcting a particular defect in an eye in an image on the basis of image data representing the image, said procedure comprising:

a preprocessing instruction that narrows down at least one of a set of images represented by the image data and a set of regions in one of the images to obtain an image or a region that meets a predetermined condition indicating a possible presence of a defect; and a correcting instruction that detects and corrects the defect in the image or region obtained at the preprocessing step on the basis of the image.

11. An eye detecting and correcting method for detecting an eye in an image on the basis of image data representing the image and, if the eye contains a defect of a predetermined type, correcting the defect, comprising:

a detecting step of detecting an eye in the image and the appearance of the eye on the basis of the image data; and a correcting step of correcting, if a plurality of eyes are detected at the detecting step and any of the plurality of eyes contains the defect, the eye containing the defect with reference to the appearance of the other eyes.

12. The eye detecting and correcting method according to claim 11, wherein the correcting step corrects the eye with reference to the appearance of the eye pairing up with the eye containing the defect.

13. The eye detecting and correcting method according to claim 11, wherein the correcting step corrects the eye with reference to the appearance of the eyes of a person other than the person with the eye containing the defect.

14. An eye detecting and correcting apparatus for detecting an eye in an image on the basis of image data representing the image and, if the eye contains a defect of a predetermined type, correcting the defect, comprising:

a detecting section that detects an eye in the image and the appearance of the eye on the basis of the image data; and a correcting section that, if a plurality of eyes are detected at the detecting step and any of the plurality of eyes contains the defect, corrects the eye containing the defect with reference to the appearance of the other eyes.

15. A computer program product, including computer-readable media comprising instructions to implement procedures for an eye detecting and correcting program for detecting an eye in an image on the basis of image data representing the image and, if the eye contains a defect of a predetermined type, correcting the defect, said procedure comprising:

a detecting instruction that detects an eye in the image and the appearance of the eye on the basis of the image data; and a correcting instruction that, if a plurality of eyes are detected at the detecting step and any of the plurality of eyes contains the defect, corrects the eye containing the defect with reference to the appearance of the other eyes.

16. The image re-touching method of claim 1, wherein the displaying step of displaying the defect detected at the detecting step displays the defect detected without displaying the corrected defect.

17. The image re-touching method of claim 1, where in the mark corresponding to the type of the defect is a shape or a color.

18. The image correcting method according to claim 7, wherein the shooting information is information relating to the quality with which the image is captured.

19. The method of claim 7 wherein the preprocessing step narrows down a set of images from a larger set of images based on the shooting information.

20. The method of claim 1, wherein receiving the correction to the inaccuracy comprises receiving a user input after display of the defect detected.

* * * * *